US012761435B2

(12) United States Patent
Cai et al.

(10) Patent No.: US 12,761,435 B2
(45) Date of Patent: Oct. 13, 2026

(54) REINFORCED PROTECTION MICRO-BUNCHED CABLE AND MANUFACTURING PROCESS THEREOF

(71) Applicant: Jiangsu Zhongtian Technology Co., Ltd., Jiangsu (CN)

(72) Inventors: Wei Cai, Jiangsu (CN); Xiaoming Miao, Jiangsu (CN); Juan Zhou, Jiangsu (CN); Lingzhi Zhu, Jiangsu (CN); Huihui Qian, Jiangsu (CN); Liang Liu, Jiangsu (CN); Yafu Miao, Jiangsu (CN); Yujie Feng, Jiangsu (CN)

(73) Assignee: Jiangsu Zhongtian Technology Co., Ltd., Jiangsu (CN)

( * ) Notice: Subject to any disclaimer, the term of this patent is extended or adjusted under 35 U.S.C. 154(b) by 282 days.

(21) Appl. No.: 18/760,031

(22) Filed: Jul. 1, 2024

(65) Prior Publication Data

US 2024/0353638 A1 Oct. 24, 2024

Related U.S. Application Data

(63) Continuation of application No. PCT/CN2023/127929, filed on Oct. 30, 2023.

(30) Foreign Application Priority Data

Apr. 19, 2023 (CN) ......................... 202310416910.7

(51) Int. Cl.
*G02B 6/44* (2006.01)

(52) U.S. Cl.
CPC ............. *G02B 6/443* (2013.01); *G02B 6/441* (2013.01)

(58) Field of Classification Search
CPC ....... G02B 6/443; G02B 6/441; G02B 6/4486
(Continued)

(56) References Cited

U.S. PATENT DOCUMENTS

| | | | | |
|---|---|---|---|---|
| 6,041,153 | A | 3/2000 | Yang | |
| 11,391,900 | B2 * | 7/2022 | Heinz | G02B 6/4436 |
| 2023/0112428 | A1 * | 4/2023 | Jenkins | G02B 6/4431 385/113 |

FOREIGN PATENT DOCUMENTS

| | | | | |
|---|---|---|---|---|
| CN | 107065091 A * | 8/2017 | | G02B 6/44 |
| CN | 109116494 | 1/2019 | | |

(Continued)

OTHER PUBLICATIONS

"International Search Report (Form PCT/ISA/210) of PCT/CN2023/127929," mailed on Dec. 21, 2023, with English translation thereof, pp. 1-10.

(Continued)

*Primary Examiner* — Robert Tavlykaev
(74) *Attorney, Agent, or Firm* — JCIPRNET

(57) ABSTRACT

This application belongs to the field of optical cables and provides a reinforced protection micro-bunched cable and a manufacturing process thereof. The reinforced protection micro-bunched cable includes reinforced protection micro-bunched tubes; the outer surface of the reinforced protection micro-bunched tube is arranged with bumps and there is a gap between bumps. The thickness of the micro-bunched tube wall at the gap between the bumps is still small, and the bump material is softer than the tube body material. The thickness of the micro-bunched tube wall at the gap between the bumps is still small, which can meet the construction requirements of easiness for stripping; the bump can effectively buffer the external force; further, the added bumps can increase the longitudinal tensile properties of the whole tube, and the tube was not easy to be broken under tension.

15 Claims, 3 Drawing Sheets

(58) Field of Classification Search
USPC .......................................... 385/106, 109, 112
See application file for complete search history.

(56) References Cited

FOREIGN PATENT DOCUMENTS

| | | | | |
|---|---|---|---|---|
| CN | 110888215 A | * | 3/2020 | .............. G02B 6/44 |
| CN | 211086702 | | 7/2020 | |
| CN | 212379626 | | 1/2021 | |
| CN | 112578518 | | 3/2021 | |
| CN | 212694123 | | 3/2021 | |
| CN | 113484964 | | 10/2021 | |
| CN | 113534382 | | 10/2021 | |
| CN | 113703107 | | 11/2021 | |
| CN | 215067442 | | 12/2021 | |
| CN | 113970823 | | 1/2022 | |
| CN | 215416030 | | 1/2022 | |
| CN | 215575839 | | 1/2022 | |
| CN | 114706179 | | 7/2022 | |
| CN | 115394496 | | 11/2022 | |
| CN | 115933079 | | 4/2023 | |
| CN | 116148999 | | 5/2023 | |
| JP | S54124744 | | 9/1979 | |
| JP | 8-62462 | * | 3/1996 | .............. G02B 6/44 |
| JP | 2009053615 | | 3/2009 | |
| JP | 2020197655 | | 12/2020 | |
| KR | 20050088709 | | 9/2005 | |
| KR | 10-2010-0083408 | * | 7/2010 | .............. G02B 6/44 |
| TW | 454879 | | 9/2001 | |

OTHER PUBLICATIONS

"Written Opinion of the International Searching Authority (Form PCT/ISA/237) of PCT/ CN2023/127929," mailed on Dec. 21, 2023, with English translation thereof, pp. 1-9.
"Office Action of China Counterpart Application", issued on May 31, 2023, with English translation thereof, p. 1-p. 10.
"Notification to Grant Patent Right for Invention of China Counterpart Application", issued on Jun. 8, 2023, with English translation thereof, p. 1-p. 6.
"Search Report of Europe Counterpart Application", issued on Apr. 8, 2025, p. 1-p. 8.

* cited by examiner

REINFORCED PROTECTION MICRO-BUNCHED CABLE AND MANUFACTURING PROCESS THEREOF

CROSS-REFERENCE TO RELATED APPLICATION

This application is a continuation of international application of PCT application serial no. PCT/CN2023/127929 filed on Oct. 30, 2023, which claims priority to Chinese Patent Application No. 202310416910.7, filed on Apr. 19, 2023. The entirety of each of the above mentioned patent applications is hereby incorporated by reference herein and made a part of this specification.

BACKGROUND

Technical Field

This application relates to the field of optical cables, and specifically relates to a reinforced protection micro-bunched cable and a manufacturing process thereof.

Description of Related Art

In recent years, the application of micro-bunched optical cable gets becoming more and more widespread. The main advantages of the micro-bunched tube within micro-bunched cable lie in easiness for stripping, small bending radius, good flexibility, and so on. However, because of its characteristic of being easy for stripping, the material of micro-bunched tube is relatively soft, which leads to compressional deformation of micro-bunched tube in the optical cable under external force. Eventually, the optical fiber is stressed and the transmission performance of the entire optical cable is affected.

In order to solve the technical problem, in existing technologies, the combination of thermoplastic reinforcing wire melting-processing fiber reinforced plastics (MFR) and loose tube is adopted, which improves the axial contractility resistance of loose tube without affecting the softness and radial shrinkage of loose tube. For example, the patent CN211086702U proposes an anti-contraction loose tube based on the thermoplastic reinforcing wire MFR. However, the loose tube provided by this patent has a structure of total three layers: that is, a steel mesh hard armor layer as an inner layer, a glass fiber soft armor layer as a middle layer, and a nylon sheath layer as an outer layer; and such structure guarantees the softness of the loose tube and anti-contraction properties, but the multi-layer composite structure increases the diameter of optical cable, that is not conducive to the requirements of optical cable for large number of cores, and does not have a good stripping performance of the optical cable.

SUMMARY

In order to solve the problems existing in the prior art, the present application studied the extrusion resistance of micro-bunched tubes, modifies current morphological structure of the micro-bunched tubes and provides a reinforced protection micro-bunched cable and its manufacturing process. The reinforced protection micro-bunched cable includes micro-bunched tubes, which makes an improvement of the conventional surface structure of the original micro-bunched tubes, including adding bumps to the external surface of micro-bunched tube and arranging a gap between the bumps. The thickness of the micro-bunched tube wall at the gap between the bumps is still small, which can meet the construction requirements of being easy to strip; the bump material is softer than the tube body material, and setting of bumps can effectively buffer the external force; further, the additional bumps can increase the longitudinal tensile properties of the whole tube, so that the micro-bunched tube is not easy to be broken under tension.

In a first aspect, an embodiment of the present application provides a reinforced protection micro-bunched cable that includes a plurality of micro-bunched tubes, each micro-bunched tube filled with an optical fiber and water blocking material, where an outer surface of the micro-bunched tube is uniformly arranged with bumps along a circumference of its radial section; a gap is disposed between adjacent bumps; a radius of each bump is same as a thickness of a micro-bunched tube wall; a Shore D hardness of a bump material is smaller than that of a micro-bunched tube wall material; the bumps deform after being stressed until they are depressed into the micro-bunched tube wall with increase of stress; and an inner wall of the micro-bunched tube wall is extruded to form small convex arcs.

In some embodiments, the micro-bunched tube has a material of LSZH, TPEE, TPU or polyolefin, a density of 1.05-1.55 g/cm$^3$, a tensile strength of 12-18 MPa, and an elongation at break between 120% and 550%.

In some embodiments, an optical fiber core is 1-12 in number, the micro-bunched tube wall has a thickness of 0.14±0.04 mm, and the micro-bunched tube has an outer diameter between 0.95 mm and 1.55 mm.

In some embodiments, the bump is hemispherical or pyramidal, and the Shore D hardness of the bump material is 2-3 degrees smaller than that of the micro-bunched tube wall material.

In some embodiments, the water blocking material includes at least one of jelly and water blocking yarn; the jelly includes a liquid and a thickener; the liquid is at least one of silicone oil and fluorinated oil; the thickener is at least one of silicon dioxide, bentonite, and polytetrafluoroethylene; the water blocking yarn is cotton yarn type.

In a second aspect, the present application provides a reinforced protection micro-bunched cable including an outer sheath, a reinforced layer, a reinforcement, and a cable core, the cable core being cladded with the reinforced layer and the outer sheath successively, and the reinforcement symmetrically being embedded in an inner wall of the outer sheath; where

- an outer wall of the outer sheath is circular, the inner wall of the outer sheath forms an oval inner cavity, a thickness of a short-axis wall of the outer sheath is greater than a thickness of a long-axis wall of the outer sheath, and the reinforcement is embedded in the short-axis wall of the outer sheath;
- the reinforced layer fits to the inner cavity of the outer sheath to form an oval outer wall, an inner wall of the reinforced layer forms a circular inner cavity, a thickness of a long-axis wall of the reinforced layer is greater than a thickness of a short-axis wall of the reinforced layer, and addition of the thickness of the long-axis wall of the reinforced layer and the thickness of the long-axis wall of the outer sheath is equal to the sum of the thickness of the short-axis wall of the reinforced layer and the thickness of the short-axis wall of the outer sheath;
- the cable core includes a plurality of micro-bunched tube units including a micro-bunched tube, the micro-bunched tube filled with an optical fiber and water blocking material, an outer surface of the micro-bunched tube is uniformly arranged with bumps along a circumference of its radial section, a gap is disposed between adjacent bumps, a radius of each bump is same as a thickness of a micro-bunched tube wall; a Shore D hardness of the bump material is smaller than that of the micro-bunched tube wall material; the bumps deform after being stressed until they are depressed into the micro-bunched tube wall with increase of stress; and an inner wall of the micro-bunched tube wall is extruded to form small convex arcs.

In some embodiments, a marking line is arranged at an apex of the long-axis wall of the outer sheath for marking an optimal stripping position.

In some embodiments, the long-axis wall of the reinforced layer is provided with a stripping joint corresponding to the marking line.

In some embodiments, the stripping joint provided in the long-axis wall of the reinforced layer is a gap connected by mortise and tenon, or an easy-striping window connected by a flexible material.

In a third aspect, the present application provides a manufacturing process for manufacturing the reinforced protection micro-bunched cable, including the steps of:

- in an extrusion process of the micro-bunched tube, choosing a matched extrusion mold and feeding an optical fiber bundle to a head of an extrusion machine, where a feedstock for the head includes two parts: one part being the micro-bunched tube wall material, the other part being the bump material on a surface of the micro-bunched tube wall;
- setting an extrusion temperature, where a body of the extrusion machine is divided into multiple body temperature zones in a direction from a feed inlet to an entrance of the extrusion mold, a temperature of the multiple body temperature zones increases successively along an extrusion direction from the feed inlet to the entrance of the extrusion mold, and a temperature of the extrusion mold is lower than a temperature of the body of the extrusion machine close to the entrance end of the extrusion mold;
- extruding the micro-bunched tube wall and the bumps at the same time using a double-layer co-extrusion process, so as to obtain an integrally-formed micro-bunched tube;
- cooling the integrally-formed micro-bunched tube through a cooling water tank, the cooling water tank being divided into a first cooling water tank and a second cooling water tank, where a temperature of the first cooling water tank is higher than that of the second cooling water tank, and the integrally-formed micro-bunched tube passes through the first cooling water tank and the second cooling water tank successively.

Compared with the prior art, this application can achieve the following beneficial effects.

1. In this application, bumps are disposed on the outer wall of the micro-bunched tube and there are gaps between the bumps, and the thickness of the tube wall at the gap is still small, which makes it easier to strip compared with the traditional micro-bunched tube coupled with the reinforced layer, meeting the construction requirements of being easy to tear off. At the same time, the radius of the bump is consistent with the thickness of the tube wall, thereby reducing the size of the micro-bunched cable and improving the optical fiber filling rate.
2. In this application, bumps are arranged on the outer wall of the micro-bunched tube. Compared with the prior art, the bump material is softer than the tube body material; after being subjected to external force, the bumps can effectively buffer the external force through deformation; when the extrusion deformation occurs to a certain extent, the bumps will be sunken into the tube, extrude the inner wall of the tube and form small convex arcs on the inner wall of the tube, which can increase the extrusion buffering of the optical fiber and improve the strength and lateral compression resistance of the optical cable.
3. In the micro-bunched cable of this application, the reinforcement is embedded in the short-axis wall of the outer sheath; the addition of the thickness of the long-axis wall of the reinforced layer and the thickness of the long-axis wall of the outer sheath is equal to the sum of the thickness of the short-axis wall of the reinforced layer and the thickness of the short-axis wall of the outer sheath. Compared with the prior art, the strength of the optical cable on the entire circumference is improved, avoiding the problem of the optical cable attenuation exceeding the standard due to the deformation caused by uneven strength of the optical cable when the external force is applied on the circumference.
4. In this application, a marking line is arranged at the apex of the long-axis wall of the outer sheath and the optimal stripping position is defined, which reduces the difficulty for the workers to find the cable stripping point. At the same time, the long-axis wall of the reinforced layer is provided with a stripping joint at its top end, which allows the workers to quickly strip the reinforced layer after stripping off the outer sheath, greatly improving the stripping and construction efficiency. Furthermore, the reinforced layer also acts as a barrier to prevent the cable core from being damaged by tools when the outer sheath is striped off.

In order to make the above purposes, features, and advantages of this application more obvious and understandable, the following provides preferred embodiments, and together with the attached drawings, provides a detailed explanation as follows.

BRIEF DESCRIPTION OF THE DRAWINGS

In order to more clearly illustrate the technical solutions of the embodiments of the present application, the drawings, which are required to be used in the embodiments, will be briefly described below. It should be understood that the following drawings illustrate only some embodiments of the present application, and therefore should not be regarded as a limitation to the scope of the present application. To those skilled in the art, other relevant drawings can be obtained from these drawings without creative works.

Figure 1:
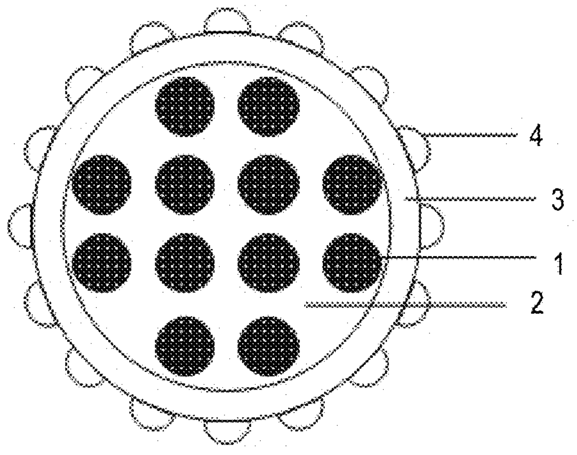
FIG. 1 shows a structurally schematic diagram of a micro-bunched tube unit of a reinforced protection micro-bunched cable of the present application.

In these figures: 1—optical fiber, 2—water blocking material, 3—micro-bunched tube, 4—bump, 5—reinforced layer, 6—outer sheath, 7—reinforcement, 8—marking line, 9—stripping joint, A—long-axis wall of outer sheath, B—short-axis wall of outer sheath, C—long axis-wall of reinforced layer, D—short-axis wall of reinforced layer.

DESCRIPTION OF THE EMBODIMENTS

The term "comprising" in the specification, claims, and figures of this application is synonymous with "including", "containing", or "characterized by" and is inclusive of endpoints or is open-ended, and does not exclude additional elements or method steps not mentioned. "Comprising" is a technical term used in the claim language to mean that the elements are present, but that other elements may be added and still form a construction or method within the scope of the claims.

It should be noted that similar signs and letters represent similar items in the drawings below, therefore, once an item is defined in one of the drawings, it is not necessary to make further definition and interpretation on the item in subsequent drawings. Furthermore, the terms "first", "second", "third", etc., are only used for the purposes of differentiation and description and are not to be understood as indicating or implying relative importance. The technical solutions in the embodiments of the present application will be clearly and completely described below in conjunction with the drawing of the embodiments of the present application, and obviously, the described embodiments are part of the embodiments of the present application rather than all of the embodiments. Based on the embodiments in this application, all other embodiments obtained by those skilled in the art without creative labor would fall within the scope of protection of this application.

Reference to "embodiments" herein implies that particular features, structures, or characteristics described in conjunction with the embodiments may be included in at least one embodiment of the present application. The presence of such phrase at various positions in the specification does not necessarily refer to the same embodiment, nor is a separate or alternative embodiment that is mutually exclusive with other embodiments. It is understood explicitly and implicitly by those skilled in the art that embodiments described herein may be combined with other embodiments.

The invention is described in detail in combination with the drawings and specific embodiments below.

Embodiment 1

A reinforced protection micro-bunched cable as in this Embodiment 1 includes multiple micro-bunched tubes 3, where each micro-bunched tube is filled with optical fibers 1 and water blocking materials 2. An outer surface of the micro-bunched tube 3 is arranged with bumps 4; and the Shore D hardness of the bump 4 material is 2-3 degrees smaller than that of a tube body material. The bumps 4 can deform after being stressed, and can be depressed into the micro-bunched tube wall with the increase of the stress, thereby extruding the inner wall of the micro-bunched tube wall to form a small convex arc.

Figure 2A:
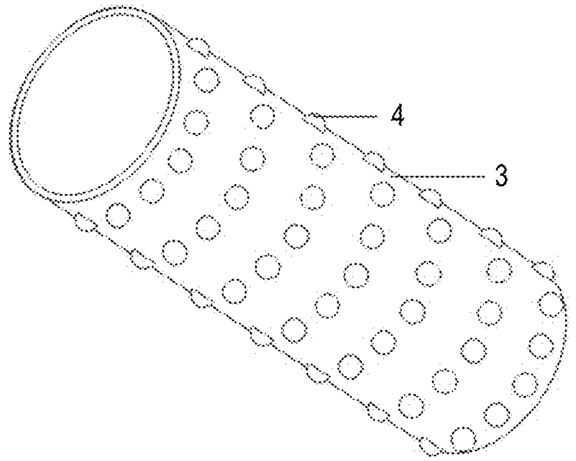
FIG. 2*a* shows a structurally schematic diagram of a micro-bunched tube of a micro-bunched cable of the present application.
Figure 2B:
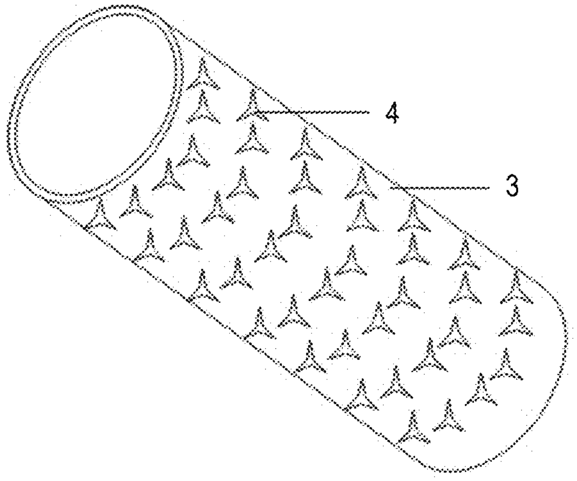
FIG. 2*b* shows a schematic diagram of another structure of a micro-bunched tube of a micro-bunched cable of the present application.

In this Embodiment 1, the structure of micro-bunched tube 3 is shown in FIG. 2*a*. The bumps 4 on the surface of the micro-bunched tube 3 are semicircular, and the radius of the bump is the same as the wall thickness of the micro-bunched tube 3, which is 0.14±0.04 mm, and the number of bumps is calculated to be between 33 and 34.

In some embodiments, the bumps 4 on the surface of the micro-bunched tube 3 are in a shape of pyramid, and the height of the pyramid is the same as the wall thickness of the micro-bunched tube 3, which is 0.14±0.04 mm.

Unlike conventional micro-bunched tubes, the design of bumps is added to the outer surface of the micro-bunched tube. There are gaps between bumps, and the wall thickness of the micro-bunched tube at the gap is still small, which can meet the construction requirements of being easy to strip. The radius of the bump is consistent with the thickness of the tube wall, thereby reducing the size of the micro-bunched cable and improving the filling rate of optical fibers. The material of bump is softer than that of the tube body. Setting bumps can effectively buffer external force, and when the extrusion deformation of the micro-bunched tube occurs to a certain extent, the inner wall of the tube is extruded to form small convex arcs, achieving further buffering effect. Further, the additional bumps can increase the longitudinal tensile properties of the whole tube, causing the tube not to be easy to break under tension.

In this Embodiment 1, the micro-bunched tube is low smoke zero halogen (LSZH), thermoplastic polyester-ether elastomer (TPEE), thermoplastic polyurethanes (TPU), or polyolefin material, and has a density of 1.05-1.55 g/cm$^3$, a tensile strength of 12-18 MPa, and an elongation at break of 120%-550%. Therefore, the micro-bunched tubes have high flexibility and tensile strength, as well as good fire resistance when the LSZH material is used.

In this Embodiment 1, there are 12 optical fibers in each micro-bunched tube, and the colors of optical fiber are blue, orange, green, brown, gray, white, red, black, yellow, and purple. The optical fiber uses G.657A2 optical fiber, and the diameter of the optical fiber coating after the optical fiber is colored is 245 μm±15 μm. The optical fibers in the micro-bunched tube are in a twisted state, and are S-twisted. The bending radius of the optical fiber is 7.5 mm, and the outer diameter of the 12-core micro-bunched tube is generally 1.5±0.05 mm.

Taking the optical fiber size of 245 μm as an example, in some embodiments, each micro-bunched tube 3 is provided with one optical fiber therein, and the outer diameter of micro-bunched tube 3 is 1.0±0.05 mm. In some embodiments, each micro-bunched tube 3 is provided with 4 optical fibers therein, and the outer diameter of the micro-bunched tube 3 is 1.2±0.05 mm. In some embodiments, each micro-bunched tube 3 is provided with 6 optical fibers therein, and the outer diameter of the micro-bunched tube 3 is 1.3±0.05 mm.

In this Embodiment 1, the micro-bunched tube is filled with a water blocking material. The water blocking material is any one of a jelly or a water blocking yarn. The jelly includes a liquid and a thickener; the liquid is at least one of silicone oil or fluorinated oil; the thickener is at least one of silicon dioxide, bentonite, or polytetrafluoroethylene; and the water blocking yarn is cotton yarn type. Different water blocking ways are adopted to meet the two requirements of dry water blocking and oil-filling water blocking.

Embodiment 2

Figure 3:
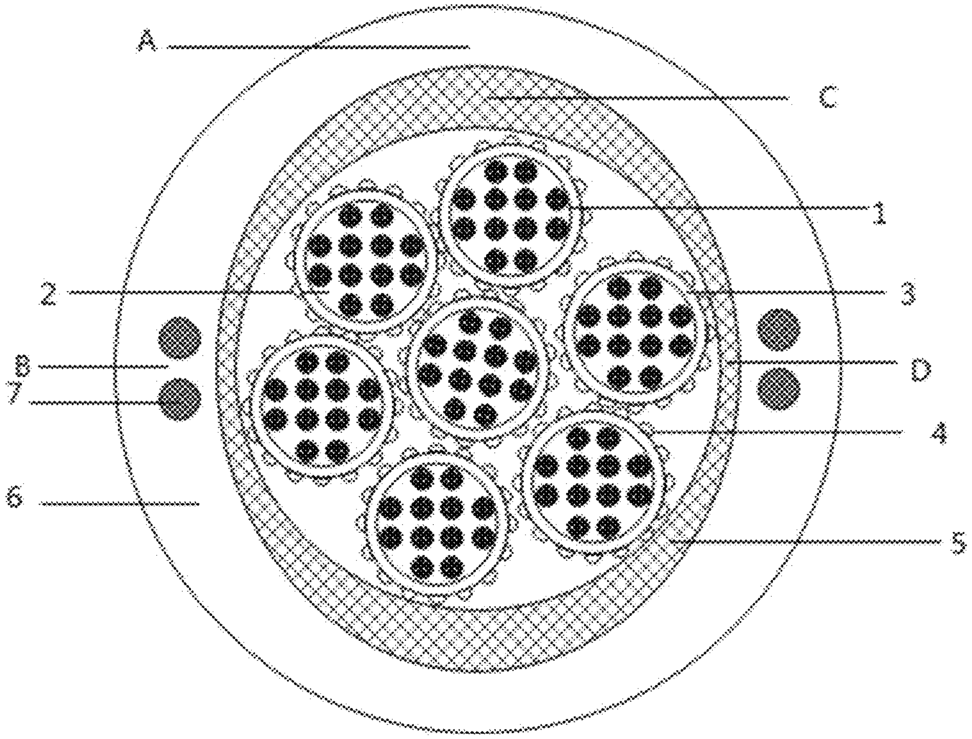
FIG. 3 shows a structurally schematic diagram of a reinforced protection micro-bunched cable of the present application.

A micro-bunched cable as in this Embodiment 2 includes an outer sheath 6, a reinforced layer 5, and micro-bunched tube units disposed once from outside to inside; 4 symmetrical reinforcements 7 are embedded in the outer sheath 6, as shown in FIG. 3. The micro-bunched tube unit includes micro-bunched tubes 3, water blocking material 2, and optical fibers 1, the optical fibers 1 being S-twisted within the micro-bunched tubes 3. The micro-bunched tube has the same structure as the "micro-bunched tube" described in Embodiment 1, and the outer wall of the micro-bunched tube is configured with bumps mutually spaced apart to improve the compressive property and tensile strength of the micro-bunched cable, while ensuring that the micro-bunched cable is easy to peel off.

In this Embodiment 2, the outer sheath 6 has a circular periphery, its inner wall forms an oval inner cavity, the thickness of a short-axis wall B of the outer sheath is greater than the thickness of a long-axis wall A of the outer sheath, and the reinforcements 7 are embedded in an inner wall of the short axis of the outer sheath. The reinforced layer 5 fits to an inner cavity of the outer sheath 6 to form an oval outer periphery, and the inner wall forms a circular inner cavity. The thickness of the long-axis wall C of the reinforced layer is greater than the thickness of the short-axis wall D of the reinforced layer, and the addition of the thickness of the long-axis wall C of the reinforced layer and the thickness of the long-axis wall A of the outer sheath is equal to the sum of the thickness of the short-axis wall D of the reinforced layer and the thickness of the short-axis wall B of the outer sheath. Therefore, the thickness of the long-axis wall C of the reinforced layer enhances the strength of the optical cable in the direction of the long axis of the outer sheath 6, so that the optical cable has a more uniform compressive strength around the circumference, avoiding the problem of the optical cable attenuation exceeding the standard due to the deformation caused by uneven strength of the optical cable when the external force is applied on the circumference.

In this Embodiment 2, the reinforced layer 5 may be made of materials such as aramid yarn and fiberglass, and the reinforcement 7 is a rigid material, preferably fiber reinforced polymer (FRP). The setting of reinforced layers and the reinforcements can effectively improve the tensile properties and resistance to local pressure of micro-bunched cables, so as to improve protection performance of optical fiber.

The optical cable needs to meet the requirements of full section water blocking, and both the micro-bunched tube and the whole cable core have extremely high water blocking requirements. In this embodiment, the micro-bunched tube is filled with water blocking material to meet the requirements of full section water resistance, and the water blocking material includes at least one of the fiber jelly or water blocking powder. The micro-bunched tube can adopt different water blocking ways to meet the requirements of dry water blocking and oil-filling water blocking.

Embodiment 3

The structure of reinforced protection micro-bunched cable in this embodiment differs from that of Embodiment 2 in that a stripping structure is provided for the outer sheath 6 and the reinforced layer 5.

Figure 4:
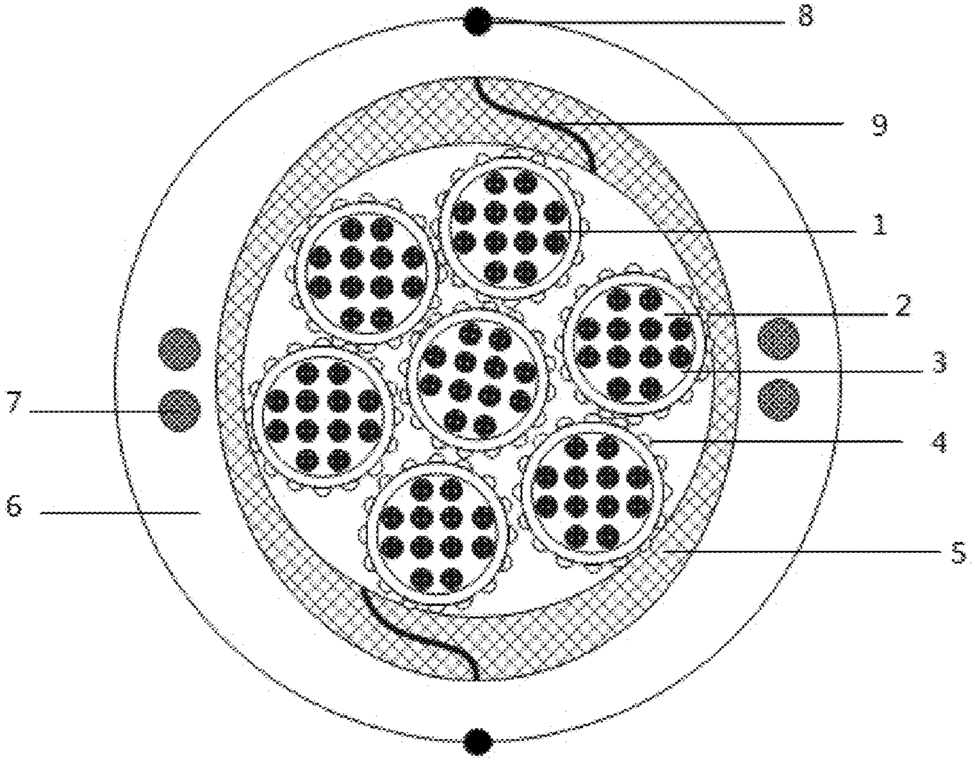
FIG. 4 shows a structurally schematic diagram of another reinforced protection micro-bunched cable of the present application.

Specifically, as shown in FIG. 4, a marking line is embedded at the apex of the long-axis wall A of the outer sheath, which is equivalent to defining the optimum stripping position on the optical cable surface by the marking line, thereby reducing the difficulty for the workers to find the optical cable stripping point, and improving the accuracy of determining the optical cable stripping point by the workers.

In this Embodiment 3, a stripping joint 9 is provided at the long-axis wall C of the reinforced layer, and a press-fit riveting of the reinforced layer is formed at the stripping joint 9. The joint may be a gap or may be bonded by soft materials, which allows the workers to quickly peel off the reinforced layer after peeling off the outer sheath, greatly improving the stripping efficiency. Furthermore, the reinforced layer 5 also acts as a barrier to avoid damage to the cable core caused by tools when the outer sheath is stripped.

Embodiment 4

Figure 5:
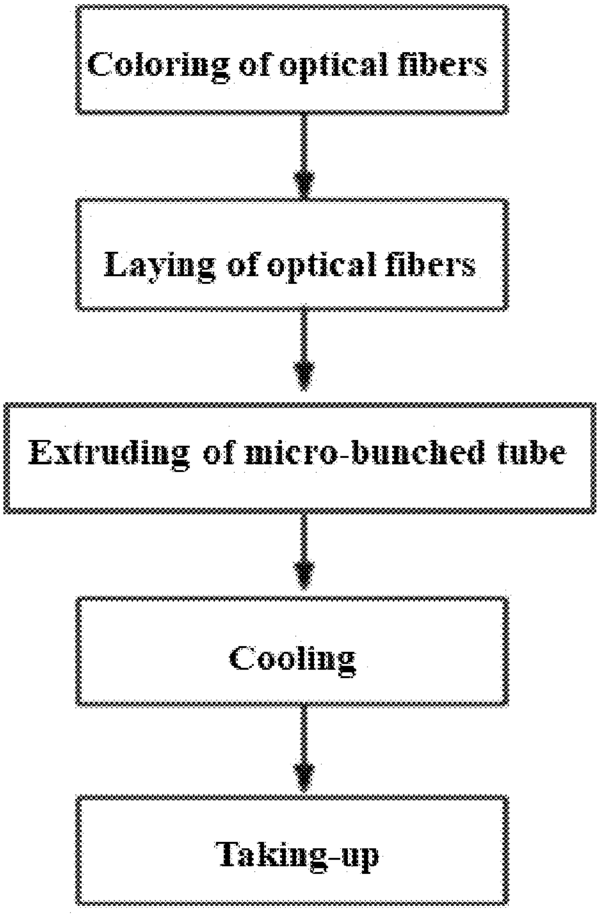
FIG. 5 shows a flow chart of a manufacturing process of a micro-bunched tube of a reinforced protection micro-bunched cable of the present application.

As shown in a process for manufacturing a micro-bunched cable according to this Embodiment 4, the manufacturing steps are shown in FIG. 5:

- step 1, coloring of optical fibers, where a coloring machine is used to color the optical fiber;
- step 2, laying of optical fibers, where the tension of the laying of optical fibers is set to 0.8-1.2N;
- step 3, extruding, where a suitable extrusion mold is selected, optical fiber bundles are fed into the head of an extrusion machine, and the feedstock for head is divided into two parts: one part being the tube body material, and the other part being the bump material on the surface.

Setting an extrusion temperature: the body of the extrusion machine is divided into multiple machine body temperature zones in a direction from a feed inlet to an entrance of the extrusion mold, and the temperatures of the body temperature zones increase successively along an extrusion direction from the feed inlet to the entrance of the extrusion mold. For example, as for an extrusion machine with 4-6 machine body temperature zones, the body temperature of the extrusion machine is set between 170° C. and 190° C., where the first and second machine bodies are set at a relatively low temperature according to the characteristics of the extruded material, which are set at 170° C.; to avoid scorching material caused by too high temperature, the third and fourth machine bodies are set at 180° C., and the fifth and sixth machine bodies are set at a relatively slightly higher temperature of 190° C., thus ensuring that the material has been sufficiently melted before it enters the mouth of the mold.

The temperature at the extrusion mold is lower than that of the body of the extrusion machine close to the entrance end of the extrusion mold, and the extrusion temperature at the extrusion mold is set at 180° C. according to the characteristics of the micro-bunched tube material.

A double-layer co-extrusion process is used to extrude the micro-bunched tube wall and the bumps at the same time, so as to form the micro-bunched tube with bumps uniformly arranged along the circumferential direction of the radial section.

- Step 4, an extruded micro-bunched tube is cooled through a cooling tank, the cooling tank being divided into a first cooling water tank and a second cooling water tank, where a temperature of the first cooling water tank is higher than that of the second cooling water tank, and the integrally-formed micro-bunched tube passes through the first cooling water tank and the second cooling water tank successively. Preferably, the water temperature of the first cooling water tank is set to 40-50° C., and the water temperature of the second cooling water tank is set to 20-30° C. The first cooling water tank uses a warm water tank, ensuring that the molecules in the micro-bunched tube material are fully crystallized to reduce the retraction of the micro-bunched tube, and the second cooling water tank uses normal temperature water for cooling.

Step 5, taking-up, where the taking-up tension is set to 2-2.5N. In this embodiment, the micro-bunched tube is relatively small and the main element for bearing tension is optical fiber, so the set taking-up tension should not be too large, setting it to 2-2.5N can ensure that the micro-bunched tube does not be ruptured, while making the micro-bunched tube straightening the take-up to the taking-up reel.

The above embodiments of this application are introduced in detail. Specific embodiments are applied to explain the principle and implementations of this application. The description of above embodiments are only used to aid in understanding the method and core ideas of this application; meanwhile, for those skilled in the art, according to the ideas of this application, there will be changes in the specific implementation and scope of application. In summary, the content of this specification should not be understood as a limitation of this application.

What is claimed is:

1. A reinforced protection micro-bunched cable, comprising:

a plurality of micro-bunched tubes, each micro-bunched tube filled with an optical fiber and water blocking material, wherein an outer surface of the micro-bunched tube is uniformly arranged with bumps along a circumference of its radial section;

a gap is disposed between adjacent bumps;

a radius of each bump is same as a thickness of a micro-bunched tube wall;

a Shore D hardness of a bump material is smaller than that of a micro-bunched tube wall material; and the bumps are configured to deform when pressed on until they are depressed into the micro-bunched tube wall with increase of stress and to thereby cause an inner wall of the micro-bunched tube wall to extrude inside and form small convex arcs.

2. The reinforced protection micro-bunched cable according to claim 1, wherein the micro-bunched tube has a material of LSZH, TPEE, TPU or polyolefin, a density of 1.05-1.55 g/cm$^3$, a tensile strength of 12-18 MPa, and an elongation at break between 120% and 550%.

3. The reinforced protection micro-bunched cable according to claim 1, wherein cores of the optical fiber are 1-12 in number, the micro-bunched tube wall has a thickness of 0.14±0.04 mm, and the micro-bunched tube has an outer diameter between 0.95 mm and 1.55 mm.

4. The reinforced protection micro-bunched cable according to claim 1, wherein the bumps are hemispherical or pyramidal, and the Shore D hardness of the bump material is smaller than that of the micro-bunched tube wall material by 2-3.

5. The reinforced protection micro-bunched cable according to claim 1, wherein the water blocking material comprises at least one of jelly and water blocking yarn; the jelly comprises a liquid and a thickener; the liquid is at least one of silicone oil and fluorinated oil; the thickener is at least one of silicon dioxide, bentonite, and polytetrafluoroethylene; and the water blocking yarn is cotton yarn type.

6. A manufacturing process for manufacturing the reinforced protection micro-bunched cable according to claim 1, comprising the steps of:

in an extrusion process of the micro-bunched tube, choosing a matched extrusion mold and feeding an optical fiber bundle to a head of an extrusion machine, wherein a feedstock for the head comprises two parts: one part being the micro-bunched tube wall material, the other part being the bump material on a surface of the micro-bunched tube wall;

setting an extrusion temperature, wherein a body of the extrusion machine is divided into multiple body temperature zones in a direction from a feed inlet to an entrance of the extrusion mold, a temperature of the multiple body temperature zones increases successively along an extrusion direction from the feed inlet to the entrance of the extrusion mold, and a temperature of the extrusion mold is lower than a temperature of the body of the extrusion machine close to the entrance end of the extrusion mold;

extruding the micro-bunched tube wall and the bumps at the same time using a double-layer co-extrusion process, so as to obtain an integrally-formed micro-bunched tube; and cooling the integrally-formed micro-bunched tube through a cooling water tank, the cooling water tank being divided into a first cooling water tank and a second cooling water tank, wherein a temperature of the first cooling water tank is higher than that of the second cooling water tank, and the integrally-formed micro-bunched tube passes through the first cooling water tank and the second cooling water tank successively.

7. The manufacturing process for manufacturing the reinforced protection micro-bunched cable according to claim 6, wherein a body temperature of the extrusion machine is set between 170° C. and 190° C.

8. The manufacturing process for manufacturing the reinforced protection micro-bunched cable according to claim 6, wherein a water temperature of the first cooling water tank is set to 40-50° C., and the water temperature of the second cooling water tank is set to 20-30° C.

9. A reinforced protection micro-bunched cable, comprising an outer sheath, a reinforced layer, a reinforcement, and a cable core, the cable core cladded with the reinforced layer and the outer sheath successively, and the reinforcement symmetrically embedded in an inner wall of the outer sheath; wherein an outer wall of the outer sheath is circular, the inner wall of the outer sheath forms an oval inner cavity, a thickness of a short-axis wall of the outer sheath is greater than a thickness of a long-axis wall of the outer sheath, and the reinforcement is embedded in the short-axis wall of the outer sheath;

the reinforced layer fits to the inner cavity of the outer sheath to form an oval outer wall, an inner wall of the reinforced layer forms a circular inner cavity, a thickness of a long-axis wall of the reinforced layer is greater than a thickness of a short-axis wall of the reinforced layer, and addition of the thickness of the long-axis wall of the reinforced layer and the thickness of the long-axis wall of the outer sheath is equal to the sum of the thickness of the short-axis wall of the reinforced layer and the thickness of the short-axis wall of the outer sheath;

the cable core comprises a plurality of micro-bunched tube units comprising a micro-bunched tube, the micro-bunched tube filled with an optical fiber and water blocking material, an outer surface of the micro-bunched tube is uniformly arranged with bumps along a circumference of its radial section, a gap is disposed between adjacent bumps, a radius of each bump is same as a thickness of a micro-bunched tube wall; a Shore D hardness of the bump material is smaller than that of the micro-bunched tube wall material; and the bumps are configured to deform until they are depressed into the micro-bunched tube wall with increase of stress and to thereby cause an inner wall of the micro-bunched tube wall to extrude inside and form small convex arcs.

10. The reinforced protection micro-bunched cable according to claim 9, wherein a marking line is arranged at an apex of the long-axis wall of the outer sheath for marking an optimal stripping position.

11. The reinforced protection micro-bunched cable according to claim 10, wherein the long-axis wall of the reinforced layer is provided with a stripping joint corresponding to the marking line.

12. The reinforced protection micro-bunched cable according to claim 11, wherein the stripping joint provided in the long-axis wall of the reinforced layer is a gap connected by mortise and tenon, or an easy-striping window connected by a flexible material.

13. A manufacturing process for manufacturing the reinforced protection micro-bunched cable according to claim 9, comprising the steps of:

in an extrusion process of the micro-bunched tube, choosing a matched extrusion mold and feeding an optical fiber bundle to a head of an extrusion machine, wherein a feedstock for the head comprises two parts: one part being the micro-bunched tube wall material, the other part being the bump material on a surface of the micro-bunched tube wall;

setting an extrusion temperature, wherein a body of the extrusion machine is divided into multiple body temperature zones in a direction from a feed inlet to an entrance of the extrusion mold, a temperature of the multiple body temperature zones increases successively along an extrusion direction from the feed inlet to the entrance of the extrusion mold, and an entrance temperature of the extrusion mold is lower than a temperature of the body of the extrusion machine close to the entrance end of the extrusion mold;

extruding the micro-bunched tube wall and the bumps at the same time using a double-layer co-extrusion process, so as to obtain an integrally-formed micro-bunched tube; and cooling the integrally-formed micro-bunched tube through a cooling water tank, the cooling water tank being divided into a first cooling water tank and a second cooling water tank, wherein a temperature of the first cooling water tank is higher than that of the second cooling water tank, and the integrally-formed micro-bunched tube passes through the first cooling water tank and the second cooling water tank successively.

14. The manufacturing process for manufacturing the reinforced protection micro-bunched cable according to claim 13, wherein a body temperature of the extrusion machine is set between 170° C. and 190° C.

15. The manufacturing process for manufacturing the reinforced protection micro-bunched cable according to claim 13, wherein a water temperature of the first cooling water tank is set to 40-50° C., and the water temperature of the second cooling water tank is set to 20-30° C.

* * * * *